US006333096B1

(12) United States Patent
Rodgers et al.

(10) Patent No.: US 6,333,096 B1
(45) Date of Patent: Dec. 25, 2001

(54) CO-EXTRUDED, MULTILAYER PACKAGING FILM MADE FROM PROPYLENE POLYMER MATERIAL

(75) Inventors: Brad D. Rodgers, Orange, TX (US); James M. Giacobbe, Laguna Beach, CA (US)

(73) Assignee: Montell Technology Company BV (NL)

( * ) Notice: Subject to any disclaimer, the term of this patent is extended or adjusted under 35 U.S.C. 154(b) by 0 days.

(21) Appl. No.: 09/468,438

(22) Filed: Dec. 21, 1999

(51) Int. Cl.[7] .................................................... B32B 27/32
(52) U.S. Cl. ........................ 428/213; 428/215; 428/216; 428/516; 525/240
(58) Field of Search ................................. 428/516, 213, 428/214, 215, 216; 525/240

(56) References Cited

U.S. PATENT DOCUMENTS

| 5,318,842 | 6/1994 | Ogale ................................. 428/349 |
| 5,453,318 | 9/1995 | Giacobbe ............................. 428/286 |
| 5,455,303 | 10/1995 | Panagopoulos, Jr. et al. ......... 525/95 |
| 5,486,419 | 1/1996 | Clementini et al. ................. 428/397 |
| 5,500,284 | 3/1996 | Burgin et al. ........................ 428/349 |
| 5,538,804 | 7/1996 | Ogale ................................. 428/515 |
| 5,741,565 | 4/1998 | Coosemans et al. ................ 428/35.2 |
| 6,218,023 | * 4/2001 | De Nicola, Jr. et al. ............ 428/515 |

* cited by examiner

*Primary Examiner*—Paul Thibodeau
*Assistant Examiner*—D. Lawrence Tarazano

(57) ABSTRACT

A co-extruded, multilayer film for packaging freshly cut produce consists of (1) an outer layer of an ethylene/propylene/4–8 C alpha-olefin terpolymer, (2) a middle layer containing at least one of (a) 0–100% of the terpolymer described in (1) and (b) 0–100% of a blend of (i) about 99.5% to about 95% of an olefin copolymer composition made by sequential polymerization in at least two stages and (ii) about 0.5% to about 5% of a low density polyethylene, wherein (a)+(b)=100%, and (3) an inner layer containing at least one of (a) 0–100% of a copolymer of ethylene and a $C_4$–$C_8$ alpha-olefin made using a metallocene catalyst and having a density of 0.89 to 0.91 g/cm$^3$, and (b) 0–100% of blend (b) described in layer (2), wherein (a)+(b)=100%. The thickness ratios of the layers and, when both components are present, the amount of each polymer in the blends of layers (2) and (3) can be varied to match the gas transmission rate of the produce to be packaged.

12 Claims, No Drawings

CO-EXTRUDED, MULTILAYER PACKAGING FILM MADE FROM PROPYLENE POLYMER MATERIAL

FIELD OF THE INVENTION

This invention relates to a multilayer film made from propylene polymer materials.

BACKGROUND OF THE INVENTION

Freshly cut fruits and vegetables continue to respire after being picked, washed and cut, and need to be packaged in such a way that the oxygen and carbon dioxide transmission rates of the packaging matches the respiration rate of the produce. Each fruit or vegetable has its own respiration rate, thereby requiring a unique package.

Various combinations of polyolefin films have been used for making food packaging materials. For example, U.S. Pat. No. 5,500,284 discloses composite films especially suited for the production of bags to be used for solid and/or liquid products, and/or to preserve products that must be kept at low temperatures. The film consists of (A) a single- or multilayer bioriented film, where the single layer or at least one layer of the bioriented film is a crystalline propylene homopolymer, and (B) a single- or multilayer cast film wherein the single layer or at least one layer of the film is a layer of a composition including a propylene polymer such as a copolymer of ethylene with propylene and/or a $C_4$–$C_8$ alpha-olefin.

U.S. Pat. No. 5,318,842 discloses a biaxially oriented film or sheet article comprising (A) a base or inner layer of a film of a $C_3$–$C_{10}$ alpha-olefin homopolymer or a copolymer such as a copolymer of propylene and two different olefins selected from ethylene and $C_4$–$C_{10}$ alpha-olefins, and (B) at least one layer of a broad molecular weight distribution propylene polymer, optionally containing another propylene polymer such as a a copolymer of propylene and at least two different olefins selected from ethylene and $C_4$–$C_8$ alpha-olefins. The films are described as having improved stiffness and moisture vapor transmission properties compared to conventional film grade polyolefin resins.

U.S. Pat. No. 5,741,565 discloses a multilayer cast film comprising (A) at least one layer of a propylene homopolymer, copolymer, or terpolymer with ethylene and/or a $C_4$–$C_8$ alpha-olefin, and (B) at least one layer of a propylene homopolymer, copolymer, or terpolymer with ethylene and/or a $C_4$–$C_8$ alpha-olefin or a composition of a random copolymer of propylene with ethylene and/or a $C_4$–$C_{10}$ alpha-olefin. The preferred film is made up of three layers in which (B) is placed between two outer layers of (A), or (A) is placed between two outer layers of (B). The films are especially useful for confectionery packaging.

There is still a need for a packaging material for fresh produce that can be tailored to match the gas transmission rate of a particular fruit or vegetable being packaged and thus meet the needs of individual producers.

SUMMARY OF THE INVENTION

The co-extruded, multilayer film of this invention comprises the following layers:
(1) an outer layer of a terpolymer comprising (a) about 85% to about 96% propylene, (b) about 0.5% to about 5.0% ethylene, and (c) about 2.5% to about 10% of a $C_4$–$C_8$ alpha-olefin, wherein the total of (b) and (c) is about 4.0% to about 15.0%;
(2) a middle layer comprising at least one of (a) 0–100% of the terpolymer described in (1), and (b) 0–100% of an olefin polymer blend comprising:

(i) about 99.5% to about 95% of an olefin polymer composition produced by sequential polymerization in at least two stages, comprising:
   (A) about 5% to about 25% by weight of a copolymer of propylene with ethylene and a $C_4$–$C_8$ alpha-olefin containing about 80% to about 96% propylene, about 2% to about 10% ethylene, and about 2% to about 10% of a $C_4$–$C_8$ alpha-olefin, and
   (B) about 95% to about 75% by weight of a linear low density polyethylene containing up to 20% by weight of a $C_4$–$C_8$ alpha-olefin, and
(ii) about 0.5% to about 5% by weight of a low density polyethylene having a density of 0.916 to 0.922 g/cm$^3$ and a melt index of 0.2 to 20 g/10 min,
wherein (a)+(b)=100%, and
(3) an inner layer comprising at least one of (a) 0–100% of a copolymer of ethylene and a $C_4$–$C_8$ alpha-olefin made with a metallocene catalyst and having a density of 0.89–0.91 g/cm$^3$, and (b) 0–100% of the olefin polymer blend (b) described in layer (2), wherein (a)+(b)=100%.

The film can be used for packaging fresh produce. By varying the thickness ratios of the layers or, when both components (a) and (b) are present, the ratio of the components of the blends in layers (2) and (3), the film can be tailored to match the respiration rate of the particular type of produce being packaged while at the same time providing improved stiffness and optical clarity.

DETAILED DESCRIPTION OF THE INVENTION

Outer layer (1) of the film of this invention comprises an ethylene/propylene/$C_4$–$C_8$ alpha-olefin terpolymer comprising about 0.5% to about 5% ethylene, preferably about 1% to about 3%; about 2.5% to about 10%, preferably about 3% to about 6%, of a $C_4$–$C_8$-alpha-olefin, and about 85% to about 96% propylene. This layer comprises about 15% to about 35% of the total thickness of the film.

The 4–8 C alpha-olefin is preferably selected from butene-1, hexene-1, octene-1, and 4-methyl-1-pentene. Butene-1 is preferred.

The terpolymer in layer (1) can be prepared by multi-stage sequential polymerization of monomers in the presence of stereospecific Ziegler-Natta catalysts supported on magnesium dihalides in active form. Preparation of this terpolymer is described in more detail in U.S. Pat. No. 5,486,419, which is incorporated herein by reference.

Middle layer (2) of the co-extruded film comprises at least one of (a) 0–100% of the terpolymer described in layer (1) and (b) 0–100% of a blend of (i) about 99.5% to about 95%, preferably about 98% to about 95%, of an olefin polymer composition produced by sequential polymerization in at least two stages and (ii) about 0.5% to about 5%, preferably about 1% to about 5%, most preferably about 2% to about 5%, of a low density polyethylene, wherein (a)+(b)=100%.

The olefin polymer composition produced by sequential polymerization in at least two stages in blend (b) of layer (2) comprises:
(A) about 5% to about 25% by weight, preferably about 5% about 15%, of a copolymer of propylene with ethylene and a $C_4$–$C_8$ alpha-olefin containing about 80% to about 96% propylene, about 2% to about 10%, preferably about 2% to about 7%, ethylene, and about 2% to about 10%, preferably about 2% to about 8%, of a $C_4$–$C_8$ alpha-olefin, and
(B) about 95% to about 75% by weight, preferably about 85% to about 95%, of a linear low density polyethylene containing up to 20% by weight of a $C_4$–$C_8$ alpha-olefin, preferably about 5% to about 14%.

The olefin polymer composition preferably has an overall melt index (MIE) of 0.4 to 1.10, preferably 0.8 to 1.10 g/10 min, and a density of 0.905 to 0.9135 g/cm$^3$.

When both (a) and (b) are present in layer (2), the blend (b) is used in an amount of about 30% to about 70% by weight.

The $C_4$–$C_8$ alpha-olefins used for making the olefin polymer composition include, for example, butene-1, hexene-1, octene-1, and 4-methyl-1-pentene. Preferably, the alpha-olefin is butene-1.

The olefin polymer composition can be prepared using a polymerization process comprising two stages with one or more reactors in each stage, where in one stage component (A) is polymerized in one or more reactors and in another stage component (B) is prepared in one or more reactors. The order in which the components are made is not critical. However, it is preferred that component (A) is prepared in the first stage.

The polymerization is conducted in gas phase using separate fluid bed reactors in each stage and the same catalyst is used in all stages.

Hydrogen can be added as needed as a chain transfer agent for control of the molecular weight.

The reaction temperature for the polymerization of components (A) and (B) can be the same or different, and is generally from 40° to 120° C., preferably from 60° C. to 100° C.

The catalyst used in the polymerization comprises the reaction of (i) a solid catalyst component comprising a titanium compound containing at least one Ti-halogen bond supported on an activated magnesium halide and, optionally, an electron-donor compound, (ii) a non-halogen-containing aluminum alkyl compound and, optionally, (iii) an electron donor compound.

Preferably the gas phase polymerization is preceded by precontacting the catalyst with small quantities of olefin monomer, referred to as "prepolymerization", maintaining the catalyst in suspension in a hydrocarbon solvent, and polymerizing at a temperature from room temperature to 60° C. for a time sufficient to produce a quantity of polymer from 0.5 to 3 times the weight of the catalyst.

Particularly preferred are the catalysts comprising components having a regular morphology, such as spherical or spheroidal, for example. Examples of these catalysts are described in U.S. Pat. No. 5,221,651, and published European patent applications 553,805, and 553,806.

The preparation of the olefin polymer composition is described in more detail in U.S. Pat. No. 5,455,303, which is incorporated herein by reference.

The low density polyethylene in blend (b) of layer (2) can be any commercially available low density polyethylene having a melt index, as determined according to method ASTM D-1238, condition E (190° C., 2.16 kg), of 0.2–20 g/10 min, preferably 1.8 to 2.6, and a density of from 0.916 to 0.922 g/cm$^3$.

The middle layer comprises about 35% to about 60% of the total thickness of the film.

Inner layer (3) of the co-extruded film, which is always next to the produce being packaged, comprises at least one of (a) 0–100% of an ethylene/$C_4$–$C_8$ alpha-olefin copolymer having a density of 0.89–0.91 g/cm$^3$, preferably about 0.89–0.906 g/cm$^3$, made using a metallocene catalyst, and (b) 0–100% of the olefin polymer blend (b) described in layer (2), wherein (a)+(b) in layer (3)=100%.

When both (a) and (b) are present in layer (3), the ethylene/alpha-olefin copolymer is used in an amount of about 30% to about 70%, and the olefin polymer blend is used in an amount of 70% to about 30% by weight.

The third layer comprises about 15% to about 35% of the total thickness of the film.

$C_4$–$C_8$ alpha-olefins that can be used for the preparation of the ethylene copolymer made with a metallocene catalyst include butene-1; pentene-1; hexene-1; 4-methyl-1-pentene, and octene-1. Octene-1 is preferred.

The polymer compositions used to make the various layers of the multilayer film or sheet materials of this invention can also contain conventional additives, for example, stabilizers, such as antioxidants; extender oils, such as paraffinic and naphthenic oils; fillers such as $CaCO_3$, talc and zinc oxide; slip agents; antiblock agents, flame retardants, and nucleating agents such as sodium benzoate and Millad sorbitol derivatives, commercially available from Milliken Chemical Company.

When both are present, the components of the blends used for making layers (2) and (3) are typically mixed in the form of pellets using standard mixing equipment.

The co-extruded film was made by means of a standard blown film process with a three layer co-extrusion die using three different extruders. The blow-up ratio was 2.5:1. Chilled air having a temperature of 40°–45° F. was used on the outside. Although the films in the examples were produced according to a blown film process, production of the films of this invention is not limited to this process. The films can also be cast films produced by standard methods well known in the art which include charging the film-forming composition into an extruder, extruding through a flat film die, and quenching onto a chill roll.

The total thickness of the film is typically less than 5 mils. The thickness ratios of the three layers and, when both components are present, the ratio of the components of the blends in layers (2) and (3), can vary depending upon the desired end use of the film. The thickness and the composition of the film layers can therefore be varied to match the respiration rate of the particular type of produce being packaged. For example, the oxygen transmission rate measured at 100% oxygen and 23° C. can be varied from 100 to 800 cm$^3$/100 in$^2$/day and the stiffness (2% secant modulus) can be varied from 35–75 Kpsi while the haze remains at less than 10%.

The properties of the film change depending on the total thickness, e.g., the oxygen and carbon dioxide transmission rates will increase with a decrease in thickness.

For a 2 mil film, the preferred ranges for the film properties are as follows:

Haze (%): 4.5–10.0 (the lower the better)

Gloss (45°): 65–80 (the higher the better)

2% Secant modulus (psi): machine direction (MD): 45,000–54,000;

transverse direction (TD): 46,000–55,000

$O_2$ transmission rate (cm$^3$/100 in$^2$/day): 150–300

$CO_2$ transmission rate (cm$^3$/100 in$^2$/day): 800–1300.

The following test methods were used in the examples.

| | |
|---|---|
| Dart impact | ASTM D-1709 |
| Elmendorf tear strength | ASTM D-1922 |
| 2% Secant modulus | ASTM D-882 |
| Moisture vapor transmission rate | ASTM E-96 |
| Oxygen transmission rate | ASTM D-3985 |
| $CO_2$ transmission rate | ASTM D-3985 |
| % Haze | ASTM D-1003 |

| | |
|---|---|
| % Clarity | ASTM D-1003 |
| 45° gloss | ASTM D-2457 |
| Melt index (190° C., 2.16 kg) | ASTM D-1238 |

The puncture resistance of the film was measured with an Instron model 4202 testing apparatus using a 200 lb load cell. A 19 mm (0.750 in) dart probe, moving at a rate of 254 mm/min (10 in/min), was used to penetrate a 4 inch diameter section of a 150 mm (6 in) square of a film specimen that was approximately 0.010 inch (10 mils) thick. The test was conducted in a standard laboratory atmosphere of 23±2° C. (73.4±3.5° F.) and 50±5% relative humidity. The load at break, load at maximum load, and probe penetration were measured.

In this specification all parts and percentages are by weight unless otherwise noted.

EXAMPLE 1

This example describes the preparation of a three layer film in which layer (A) comprises 35% of the total thickness of the film, layer (B) 50%, and layer (C) 15%.

Layer (A) was made from a composition comprising 100 parts of a terpolymer of propylene, ethylene, and butene-1 containing 92.5% propylene, 2.5% ethylene and 5.5% butene-1, and containing a slip agent and an anti-blocking agent, commercially available from Basell USA, Inc.; 0.25 parts of sodium benzoate per hundred parts (pph) of the terpolymer; 0.05 pph DHT-4A antacid compound, commercially available from Kyowa Chemical Industry Co., Ltd.; 0.15 pph Irganox B225 antioxidant, commercially available from Ciba Specialty Chemicals Co.; 0.10 pph Sylobloc 45 antiblocking agent, commercially available from W. R. Grace, and 0.15 pph of erucamide.

Irganox B225 antioxidant is a 50/50 blend of tetrakis [methylene(3,5-di-tert-butyl-4-hydroxyhydrocinnamate)] methane and tris(2,4-di-tert-butylphenyl) phosphite.

Layer (B) was made from a blend of (i) 30% of the terpolymer composition of layer (1) and (ii) 70% of a polymer composition prepared by sequential polymerization in at least two stages and containing a slip agent and an antiblocking agent, commercially available from Basell U.S.A. Inc., comprising (a) ~95% by weight of an olefin polymer composition comprising (1) 15% of a terpolymer comprising 91.5% propylene, 2.5% ethylene, and 6.0% butene-1 and (II) 85% of a linear low density polyethylene comprising 90.8% ethylene and 9.2% butene, and (b) ~5% NA951-000 low density polyethylene, commercially available from Equistar Chemicals, LP.

Layer (C) was made from a blend of (a) 70% Affinity PL 1881 ethylene/octene-1 copolymer containing a slip agent, commercially available from Dow Plastics, made with a metallocene catalyst and having a density of 0.902 g/cm³, and (b) 30% of the polymer composition (ii) used in layer (B).

A 1.8 mil multilayer film was made by co-extruding the three layers with three extruders. Extruder (A) had a 60 mm diameter groove feed screw, extruder (B) had a 3.5" diameter smooth bore screw, and extruder (C) had a 2.5" smooth bore screw. The die was an 11" annular die typically used in blown film co-extrusion processes. The feed block temperature and the die temperature were both 410° F. The die did not have internal bubble cooling. The extrusion conditions are given below.

| | Extruder A | Extruder B | Extruder C |
|---|---|---|---|
| Melt Temp. (° F.) | 395–400 | 420–425 | 420–425 |
| Head pressure (psi) | 1700–1800 | 2500–3200 | 2000–2500 |
| Barrel zone 1 (° F.) | 360 | 360 | 375 |
| Barrel zone 2 (° F.) | 420 | 380 | 420 |
| Barrel zone 3 (° F.) | 400 | 390 | 410 |
| Barrel zone 4 (° F.) | NA | 380 | 410 |
| Barrel zone 5 (° F.) | NA | 380 | 410 |
| Screen changer (° F.) | 415 | 400 | 415 |
| Adapter (° F.) | 415 | 400 | 415 |

The film had the following properties. MD=machine direction, TD=transverse direction, MVTR=moisture vapor transmission rate, and TR=transmission rate.

| | |
|---|---|
| Dart impact (g) | 77.0 |
| Elmendorf tear strength, MD (g) | 37 |
| Elmendorf tear strength, TD (g) | 916 |
| Puncture resistance (ft. lb/in³) | 41.9 |
| 2% Secant modulus, MD (psi) | 56,500 |
| 2% Secant modulus, TD (psi) | 53,600 |
| MVTR (g/100 in²/24 hr) | 0.518 |
| $O_2$TR (cm³/100 in²/24 hr) | 172.7 |
| $CO_2$TR (cm³/100 in²/24 hr) | 965.2 |
| % Haze | 5.5 |
| % Clarity | 94.9 |
| 45° Gloss | 76.2 |

EXAMPLE 2

This example describes the preparation of a three layer film in which layer (A) comprises 35% of the total thickness of the film, layer (B) 50%, and layer (C) 15%.

Layer (A) was the same as in Example 1.

Layer (B) was made from a blend of 70% of the terpolymer composition in layer (A) and 30% of the polymer composition (ii) described in layer (B) of Example 1.

Layer (C) was made from a blend of 30% of the Dow PL 1881 ethylene/octene-1 copolymer described in Example 1 and 70% of the polymer composition (ii) described in layer (B) of Example 1.

A 2.0 mil film was co-extruded as described in Example 1. The film had the following properties:

| | |
|---|---|
| Dart impact (g) | 81.0 |
| Elmendorf tear strength, MD (g) | 29 |
| Elmendorf tear strength, TD (g) | 93 |
| Puncture resistance (ft. lb/in³) | 36.8 |
| 2% Secant modulus, MD (psi) | 72,100 |
| 2% Secant modulus, TD (psi) | 64,300 |
| MVTR (g/100 in²/24 hr) | 0.466 |
| $O_2$TR (cm³/100 in²/24 hr) | 136.8 |
| $CO_2$TR (cm³/100 in²/24 hr) | 1905.7 |
| % Haze | 7.7 |
| % Clarity | 94.6 |
| 45° Gloss | 68.0 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A co-extruded, multilayer film comprising:
   (a) an outer layer of a terpolymer comprising (i) about 85% to about 96% propylene, (ii) about 0.5% to about 5.0% ethylene, and (iii) about 2.5% to about 10% of a 4–8 C alpha-olefin, wherein the total of (ii) and (iii) is about 4.0% to about 15.0%;
   (b) a middle layer comprising at least one of (i) 0–100% of the terpolymer described in layer (a), and (ii) 0–100% of an olefin polymer blend comprising:
      (A) about 99.5% to about 95% of an olefin polymer composition produced by sequential polymerization in at least two stages, comprising:
         (1) about 5% to about 25% by weight of a copolymer of propylene with ethylene and a $C_4$–$C_8$ alpha-olefin containing about 80% to about 96% propylene, about 2% to about 10% ethylene, and about 2% to about 10% of a $C_4$–$C_8$ alpha-olefin, and
         (2) about 95% to about 75% by weight of a linear low density polyethylene containing up to 20% by weight of a $C_4$–$C_8$ alpha-olefin, and
      (B) about 0.5% to about 5% by weight of a low density polyethylene having a density of 0.916 to 0.922 g/cm$^3$ and a melt index of 0.2 to 20 g/10 min, wherein (i)+(ii)=100%, and
   (c) an inner layer comprising at least one of (i) 0–100% of a copolymer of ethylene and a $C_4$–$C_8$ alpha-olefin made with a metallocene catalyst and having a density of 0.89–0.91 g/cm$^3$, and (ii) 0–100% of the olefin polymer blend (ii) described in layer (b), wherein (i)+(ii)=100%.

2. The film of claim 1 wherein the 4–8 C alpha-olefin in layer (a) is butene-1.

3. The film of claim 1 wherein (A)(1) in layer (b) is a copolymer of propylene, ethylene, and butene-1.

4. The film of claim 1 wherein the linear low density polyethylene (A)(2) in layer (b) is a copolymer of ethylene and butene-1.

5. The film of claim 1 wherein (i) in layer (c) comprises a copolymer of ethylene and octene-1.

6. The film of claim 1 wherein outer layer (a) comprises about 15% to about 35% of the total thickness of the film.

7. The film of claim 1 wherein middle layer (b) comprises about 35% to about 60% of the total thickness of the film.

8. The film of claim 1 wherein inner layer (c) comprises about 15% to about 35% of the total thickness of the film.

9. The film of claim 1 wherein layer (a) comprises 35%, layer (b) comprises 50%, and layer (c) comprises 15% of the total thickness of the film.

10. The film of claim 1 wherein the total thickness of the film is less than 5 mils.

11. The film of claim 1 wherein the amount of (i) in middle layer (b) is about 30% to about 70% and the amount of (ii) in layer (b) is about 70% to about 30%.

12. The film of claim 1 wherein the amount of (i) in inner layer (c) is about 30% to about 70% and the amount of (ii) in layer (c) is about 70% to about 30%.

* * * * *